United States Patent [19]

Wright et al.

[11] 4,198,226
[45] Apr. 15, 1980

[54] METHOD AND APPARATUS FOR CONTROLLING A FLUIDIZED BED

[75] Inventors: Donald C. Wright, Parbold; Brian Marsh, Orrell, both of England

[73] Assignee: Pilkington Brothers Limited, St. Helens, England

[21] Appl. No.: 944,613

[22] Filed: Sep. 21, 1978

[30] Foreign Application Priority Data

Sep. 29, 1977 [GB] United Kingdom ............... 40564/77

[51] Int. Cl.² ....................... C03B 25/04; C03B 29/04
[52] U.S. Cl. ........................................ 65/114; 65/111; 65/118; 65/348; 165/104 M; 165/104 F
[58] Field of Search ................. 65/104, 114, 115, 348, 65/349, 350, 351, 111; 165/104 M, 104 F

[56] References Cited

U.S. PATENT DOCUMENTS 4,066,430   1/1978   Franz ..................... 165/104 F X

*Primary Examiner*—Arthur D. Kellogg
*Attorney, Agent, or Firm*—Burns, Doane, Swecker & Mathis

[57] ABSTRACT

A gas-fluidized bed of particulate material is operated by extracting gas from a localized region of the bed to produce an unfluidized static condition of the material in that region. The region may be in the upper part of the fluidized bed, or may be a region adjacent a side opening into the bed where the unfluidized static material obturates the opening. There may be a plurality of unfluidized static regions in the bed.

The invention is applicable to the thermal toughening of glass quenched in the fluidized bed.

22 Claims, 13 Drawing Figures

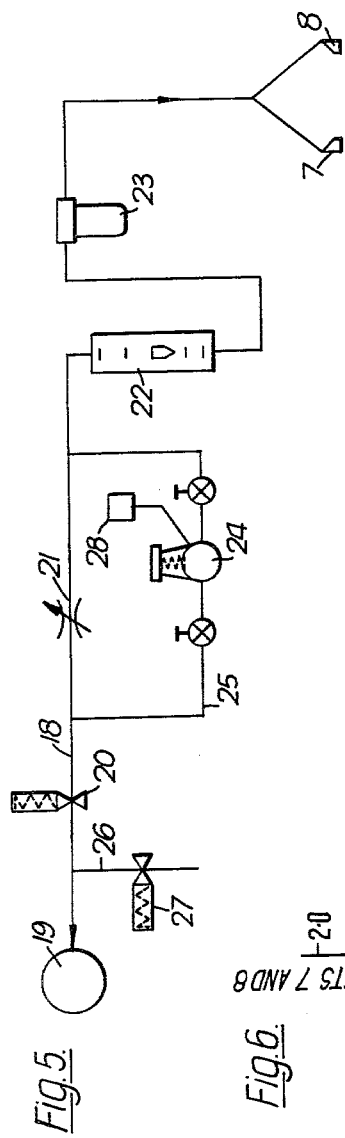
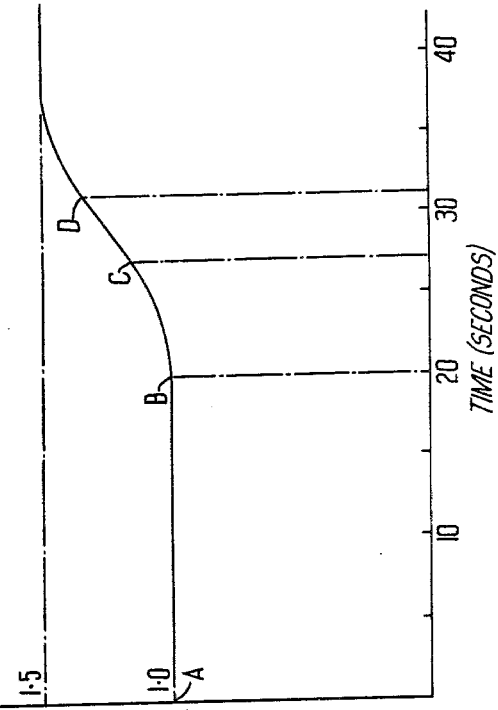
Fig.5
Fig.6

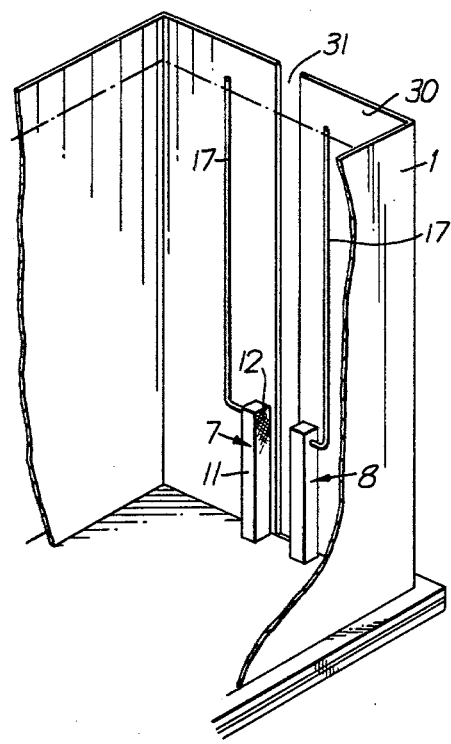
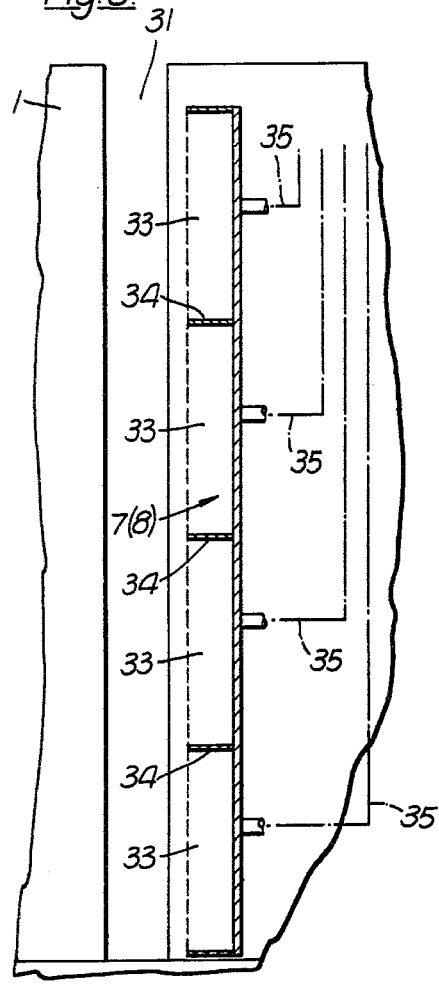
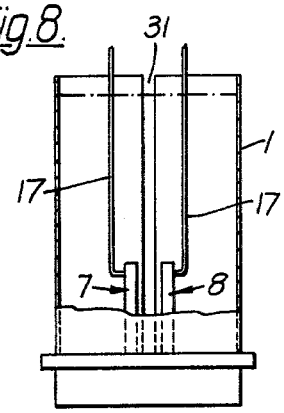

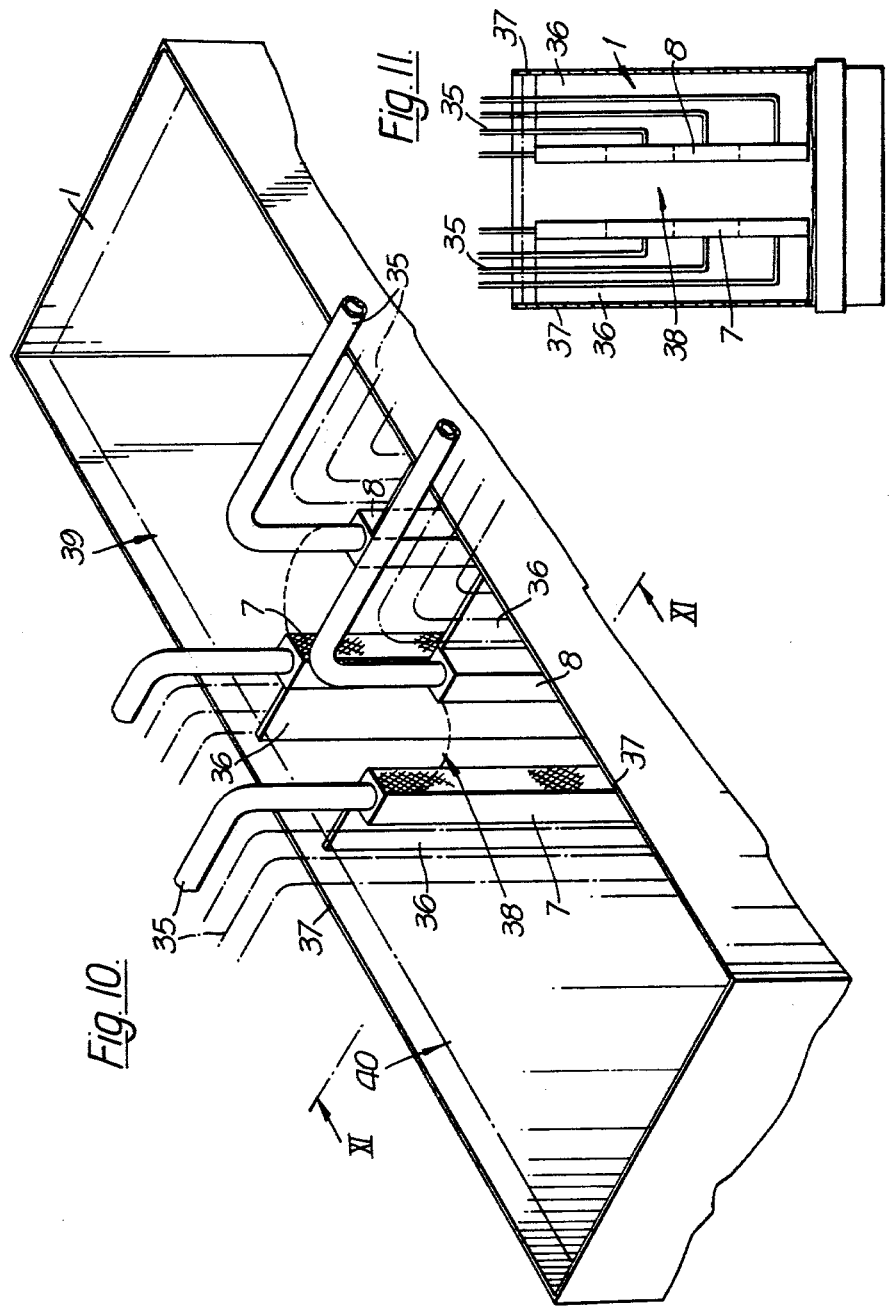

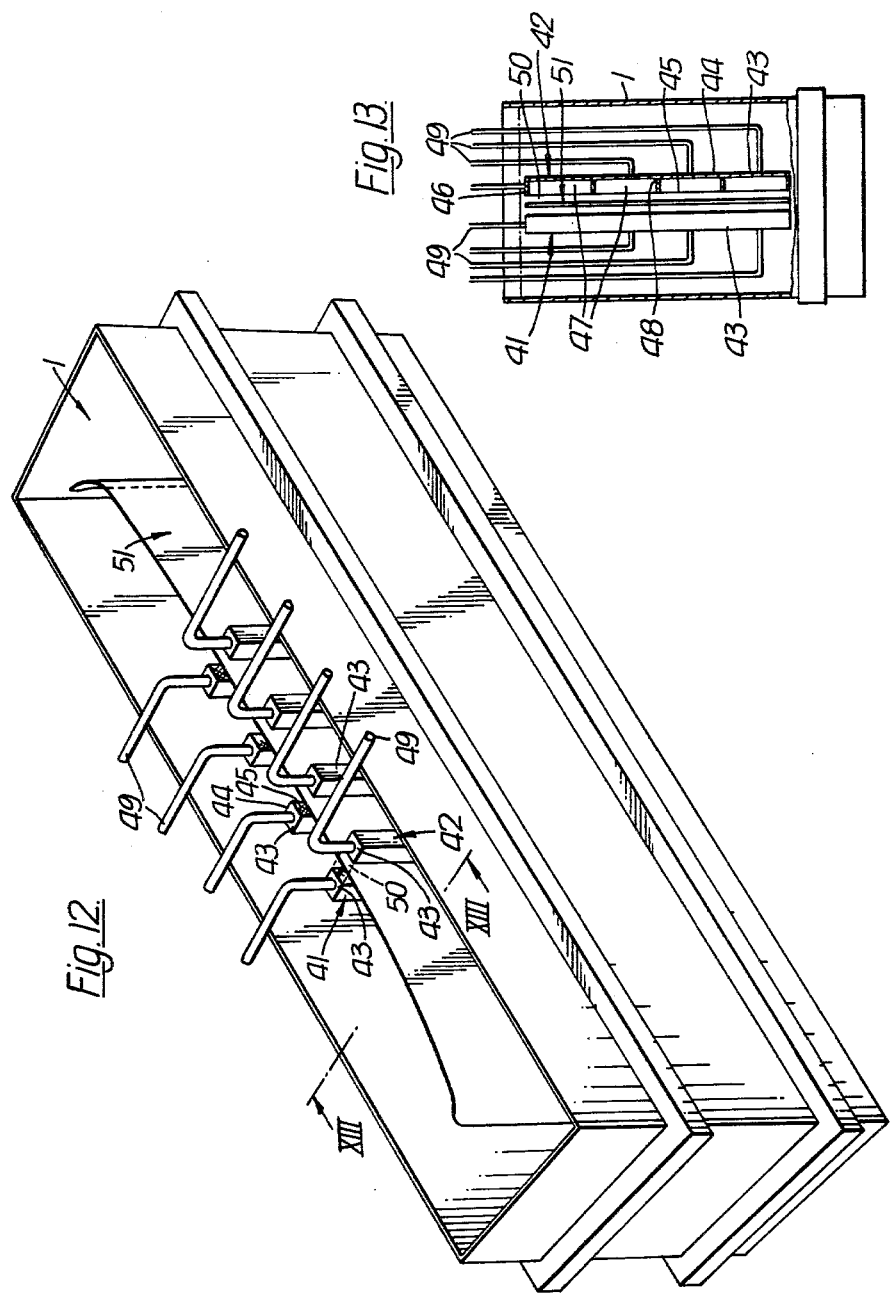

METHOD AND APPARATUS FOR CONTROLLING A FLUIDIZED BED

BACKGROUND OF THE INVENTION

1. Field of the Invention

This invention relates to fluidised beds and in particular to a method of operating a bed of gas-fluidised particulate material.

2. Description of the Prior Art

Such fluidised beds are used in carrying out many manufacturing processes.

Metal articles such as metal sheets, strip or wire may be given a thermal treatment such as quenching or annealing by immersing the articles in a fluidised bed.

It has also been proposed to toughen glass articles, such as glass sheets, by immersion of the hot glass articles in a bed of gas-fluidised particulate material which is maintained at a temperature substantially lower than that of the glass articles.

Heated fluidised beds can also be used for the rapid and uniform heating of articles immersed in such beds.

In addition, web-like materials such as textiles or paper can be dried in heated fluidised beds during manufacture.

Articles can be coated by immersing hot articles in a fluidised bed of fusible particulate material with which the articles are to be coated.

SUMMARY

It has now been realised that the operation of a variety of manufacturing processes using a bed of gas-fluidised particulate material can be improved by operation of the bed so as to produce an unfluidised static condition of the particulate material in a localised region of the bed.

The present invention relates to a method of operating a gas-fluidised bed of particulate material in such a manner.

The invention provides a method of operating a bed of gas-fluidised particulate material, comprising extracting gas from a localised region of the bed so as to produce an unfluidised static condition of the particulate material in that region of the bed.

Gas may be extracted from the localised region of the bed at a rate such that the particulate material in said region is in a packed condition.

For the treatment of an article which is immersed in the bed, gas may be extracted from a localised region of the bed located in the path taken by the article between entry into and exit from the bed, so as to produce an unfluidised static condition of the particulate material in that region of the bed.

A method of the invention is applicable to the thermal treatment of a glass sheet, for example, the thermal toughening or annealing of the sheet. Accordingly the invention comprehends a method for thermally toughening a glass sheet in a gas-fluidised bed of particulate material, comprising maintaining said gas-fluidised bed at glass-quenching temperature, heating a glass sheet to a temperature above its strain point, lowering the hot glass sheet into said gas-fluidised bed, and extracting gas from the upper region of the bed through which the glass sheet passes as it enters the bed at an extraction rate sufficient to maintain the particulate material which contacts the hot glass sheet in that region in a static packed condition as the glass sheet is lowered through that region and is subjected to an initial uniform cooling in that region.

In this application of the invention, as the glass sheet is lowered through the upper region of the bed where the particulate material is in a static packed condition, the surfaces of the glass are subjected to an initial uniform cooling which renders the glass surfaces less susceptible to distortion during subsequent cooling of the glass sheet in the main part of the fluidised bed below the upper static region of the bed.

The invention accordingly provides a method of thermally toughening a glass sheet comprising maintaining a gas-fluidised bed of particulate material in a quiescent uniformly expanded state of particulate fluidisation, regulating the temperature of said bed so that it is at glass-quenching temperature, heating a glass sheet to a temperature above its strain point, lowering the hot glass sheet into said gas-fluidised bed, and extracting gas from the upper region of the bed through which the glass sheet passes as it enters the bed at an extraction rate sufficient to maintain the particulate material which contacts the hot glass sheet in that region in a static packed condition as the glass sheet is lowered through that region and is subjected to an initial uniform cooling in that region prior to further cooling in contact with the particulate material in a quiescent uniformly expanded state of particulate fluidisation.

One way of carrying out this method comprises continuously extracting fluidising gas from a region on either side of the path of the glass sheet in the upper part of the bed as the glass sheet is lowered into the bed.

Gas may be extracted from a plurality of localised regions of the bed so as to produce an unfluidised static condition of the particulate material in each of said regions of the bed.

Gas may be extracted from at least one localised region of the bed to maintain the particulate material in the or each said region of the bed in an influidised static condition and an article is immersed in the bed in such a way that a part or parts of the article are contacted by unfluidised static particulate material in the or each said region of the bed and receive a different treatment from a part or parts of the article contacted by fluidised particulate material of the bed.

For the differential thermal toughening of a glass sheet, the method comprises immersing a hot glass sheet in the bed in such a way that parts of the glass sheet to be toughened to a lesser degree are contacted by the unfluidised static particulate material, and the parts of the glass sheet to be toughened to a higher degree are contacted by the fluidised particulate material.

Further the invention includes a method of thermally toughening a glass sheet in a gas-fluidised bed of particulate material, comprising maintaining said gas-fluidised bed at glass quenching temperature, heating a glass sheet to a temperature above its strain point, extracting gas from a series of vertical, horizontally-spaced regions of the bed to maintain the particulate material in each of those regions in an unfluidised static condition, and lowering the hot glass sheet vertically into the bed so that the parts of the glass sheet to receive a lesser degree of toughening contact the regions of unfluidised static particulate material and the parts of the glass sheet between said regions are toughened to a higher degree by contact with fluidised particulate material, thereby producing a differentially toughened glass sheet having bands of lesser toughened glass alternating with bands of more highly toughened glass.

Still further the invention includes a method of thermally toughening a glass sheet in a gas-fluidised bed of particulate material which is in a quiescent uniformly expanded state of particulate fluidisation, comprising maintaining said gas-fluidised bed at glass-quenching temperature, heating a glass sheet to a temperature above its strain point, extracting gas from a series of vertical, horizontally-spaced regions of the bed to maintain the particulate material in each of those regions in an unfluidised static condition, and lowering the hot glass sheet vertically into the bed so that the parts of the glass sheet to receive a lesser degree of toughening contact the regions of unfluidised static particulate material and the parts of the glass sheet between said regions are toughened to a higher degree by contact with fluidised particulate material in said quiescent uniformly expanded state of particulate fluidisation, thereby producing a differentially toughened glass sheet having bands of lesser toughened glass alternating with bands of more highly toughened glass.

The invention also comprehends apparatus for treating an article, comprising a container for a gas-fluidised bed of particulate material, and gas-extraction means mounted in the container for extracting gas from a localised region of the fluidised bed to produce an unfluidised static condition of the particulate material in that region.

The gas-extraction means may be at least one gas-extraction duct located adjacent said localised region.

The apparatus may also comprise means for moving the article in a path within the container, and wherein the gas-extraction means is position to produce said localised region of the fluidised bed in said path.

In one apparatus according to the invention the gas-extraction means may comprise two elongated gas-extraction ducts arranged face-to-face and spaced apart in the container to define a path for an article therebetween, which extraction ducts are arranged to extract gas from the region of the fluidised bed between the ducts.

Preferably the ducts are mounted horizontally in an upper part of the container. The two ducts may be parallel to each other.

Further according to the invention the gas-extraction means may comprise a plurality of vertical gas-extraction ducts which are spaced apart from each other and are positioned in the container to extract gas from a plurality of localised vertical regions in the path of the article.

The gas-extraction ducts may be first and second banks of vertical parallel gas-extraction ducts mounted in the container, with the ducts in the two banks arranged facing one another and spaced apart to permit vertical entry of an article between the two banks.

Each of the vertical gas-extraction ducts may be divided vertically into compartments with an individual gas-extraction pipe connected to each compartment.

In order that the invention may be more clearly understood some embodiments thereof will now be described, by way of example, with reference to the accompanying drawings in which:

FIG. 5 shows schematically a gas extraction system for operation of the apparatus of FIG. 1;

FIG. 6 is a graph illustrating the operation of the apparatus of FIG. 1 using the gas extraction system of FIG. 5;

FIG. 7 is a perspective view of one end of a second embodiment of apparatus according to the invention showing two gas-extraction ducts arranged vertically adjacent a vertical opening in one end wall of a container for a fluidised bed of particulate material;

FIG. 8 is an end elevation, partly cut away, of the apparatus of FIG. 7;

FIG. 9 is a sectional detail of a modification of the apparatus of FIG. 7;

FIG. 10 is a perspective view of a third embodiment of the invention showing two pairs of gas-extraction ducts arranged vertically within a tank containing a fluidised bed of particulate material;

FIG. 11 is a part cross-section, on line XI—XI, of the apparatus of FIG. 10;

FIG. 12 is a perspective view of a fourth embodiment of apparatus according to the invention showing two banks of gas-extraction ducts arranged vertically in a tank containing a fluidised bed of particulate material to define an entry path for glass sheets into the bed between the two banks of ducts; and FIG. 13 is a part cross-section, on line XIII—XIII, of the apparatus of FIG. 12.

Figure 1:
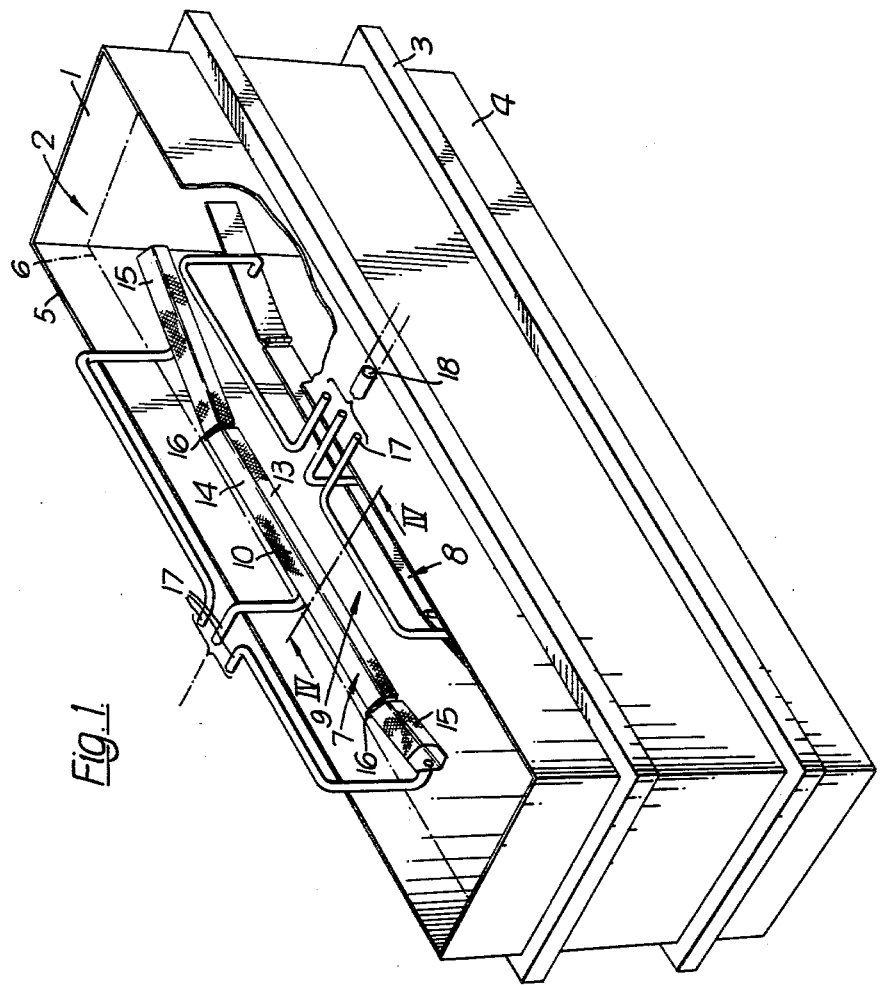
FIG. 1 is a perspective view, partly cut away, of a tank containing a fluidised bed of particulate material with two gas extraction ducts positioned in the top of the tank to define an entry path for articles into the fluidised bed between the ducts.

Referring to the drawings FIGS. 1 to 4 illustrate diagrammatically a deep tank 1 which acts as a container for a gas-fluidised bed 2 of particulate material which may be maintained in a quiescent uniformly expanded state of particulate fluidisation. The particulate material may be for example a $\gamma$-alumina of mean particle size 64 $\mu$m and a particle density of 2.2 g/cm$^3$. The material is fluidised by upward flow of fluidising gas, usually air, for example at a flow rate of 0.54 cm/sec, uniformly over the base of the bed from the upper surface of a porous membrane 3 from a plenum chamber 4 at the bottom of the tank. A high pressure drop across the membrane 3 assists the maintenance of the quiescent state of the bed, for applications such as the thermal treatment of hot glass sheets when such a state of the bed is desirable.

The tank is mounted on a lifting table so that it can be raised into position to receive a hot bent glass sheet which is lowered vertically from a bending station, not shown, to be thermally toughened by quenching in the fluidised bed.

The fluidised particulate material expands upwardly through substantially the whole depth of the tank 1. The surface level of the fluidised bed is indicated at 6 just below the upper edge 5 of the tank. When thermally toughening sheets of soda-lime-silica glass the glass sheets may be at a temperature in the range 610° C. to 680° C., and the temperature of the fluidised material is usually in the range 30° C. to 150° C., preferably about 60° C. to 80° C.

When the hot glass sheet is lowered into the fluidised particulate material in the tank 1 very rapid agitation of the particulate material is engendered at the surfaces of the glass sheet. This agitation of the particulate material may due to the generation of a thin glas films at the surfaces of the glass sheet. At the surface of the bed of particulate material the gas films break up into channels so that there may be non-uniform initial cooling of the surfaces of the glass sheet as it passes through the top of the fluidised bed. Such non-uniform initial cooling of the surfaces of the glass sheet can in some circumstances lead to an unacceptable loss in the optical quality of the surfaces of the glass sheet.

This difficulty can be avoided according to the invention, by extracting gas from the upper region of the bed through which the glass sheet passes as it enters the bed at an extraction rate sufficient to maintain the particulate material which contacts the glass sheet in that region in a static packed condition as the glass sheet is lowered through that region. The unfluidised static layer so produced subjects the surfaces of the glass sheet to an initial uniform cooling as the glass sheet is lowered through that region and enters the fluidised bed. In order to provide this unfluidised static layer in the upper region of the fluidised bed, the particulate material is defluidised in the region which extends downwardly from the top surface of the bed.

Gas-extraction means is mounted in the container and includes gas-extraction ducts indicated generally at 7 and 8 which are arranged face-to-face at a location such that the ducts 7 and 8 are just below the surface level 6 of the fluidised bed. The ducts 7 and 8 are spaced apart to define an entry path 9 for the glass sheets, which path is for example 125 mm wide, and are thus located adjacent the localised region of the bed which is to be defluidised.

Figure 4:
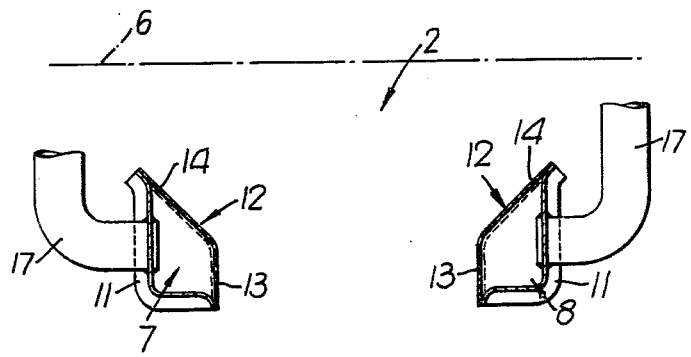
FIG. 4 is a detail in section on the line IV—IV in FIG. 1.

Each of the ducts 7 and 8 has a main control part 10 comprising an L-shaped channel member 11, FIG. 4. A microporous woven wire mesh 12 is affixed to each channel member 11 to form an inwardly facing wall 13 and a sloping wall 14 of the duct 7 or 8. A suitable microporous woven wire mesh material is that manufactured by Sintered Products Limited, Hamilton Road, Sutton-in-Ashfield, Nottinghamshire, England, referenced R M 5A. This material comprises a multilayer construction of sheets of woven stainless steel wire mesh with the sheets sintered together and has a permeability to air of 97.3 litres/sec/meter$^2$ at a pressure difference of 1 kPa.

Each duct 7,8 has wing parts 15 which are of similar construction to the central part 10 and which are attached to the ends of the central part 10 by hinges 16. By adjustment of the angle of the wing parts 15 relative to the central parts 10 of the ducts 7 and 8, the ducts 7 and 8 can be set to match approximately the curved shape of the bent glass sheets which are to be toughened.

In one embodiment the ducts 7 and 8 are 50 mm deep, 25 mm wide and of an overall length equal to that of the glass sheet, e.g. 2 m for a windscreen glass. In this arrangement the ducts 7 and 8 are located at a depth of 50 mm below the surface level 6 of the fluidised bed.

Figure 2:
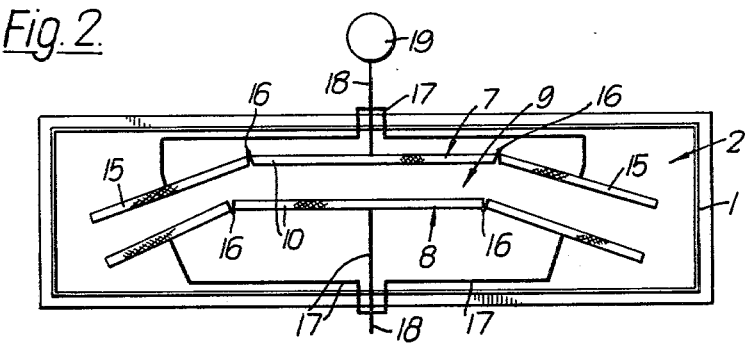
FIG. 2 is a plan view of the embodiment of FIG. 1.
Figure 3:
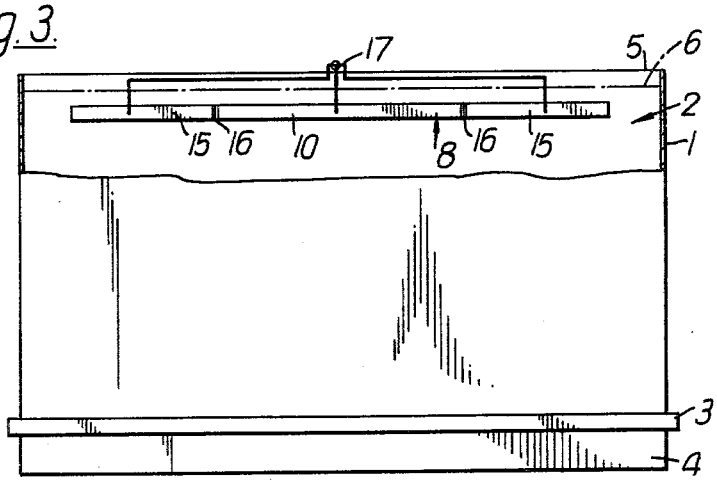
FIG. 3 is a front elevation, partly cut away, of the apparatus of FIG. 1.

A branched pipe 17 connects the central part 10 and the two wing parts 15 of each duct to a manifold line 18 leading to a vacuum pump 19, FIG. 2.

When suction is applied to the ducts 7 and 8 by means of the vacuum pump 19 fluidising gas is extracted from the region between and above the ducts 7 and 8 through the walls of the ducts formed by the microporous wire mesh 12 and the particulate material at the top of the fluidised bed becomes defluidised to provide, by suppression of upward escape of fluidising gas, a static packed region of particulate material through which the hot glass enters the fluidised bed.

The suction applied is so controlled that the packing density of the particles is such that the hot glass sheet can penetrate the static packed particulate material without any deformation of the glass sheet. In the particular arrangement described the application of a degree of suction which results in a gas-extraction rate of 1.25 liters/sec per meter length of the ducts 7 and 8 was found to be suitable resulting in a static packed layer about 120 mm deep which could be readily penetrated by the lower edge of the glass sheet.

For the best results it is preferred that the packing of the static layer should be greater than that which the glass sheet can freely penetrate. This can be achieved by starting with the bed fluidised and without suction applied to the ducts 7 and 8 when the hot glass sheet is ready to be lowered into the fluidised bed.

Prior to the start of lowering of the glass sheet into the bed, suction is applied to the ducts 7 and 8 so as to commence extraction of gas from the upper region of the bed. The rate of gas extraction is regenerated to produce a static packed condition of the particulate material in the upper region of the bed. The final state of packing achieved in the particulate material is higher than that in the previous example and is higher than that at which the lower edge of the glass sheet could readily penetrate the top surface of the bed. The lower edge of the glass sheet reaches the top surface 6 of the fluidised bed at a time after commencement of gas extraction which is such that the lower edge of the glass sheet passes through the upper region prior to full attainment of the final packed state and the particulate material in the upper region of the bed has reached a partially packed condition such that the lower edge of the sheet can readily penetrate the top of the bed. At this point the particulate material at the top of the bed may even be in a lesser state of compaction than that used in the previous example thus making entry of the lower edge of the glass sheet through the top of the fluidised bed more easy. The glass sheet is lowered through the upper region into the bed whilst the packing of the particulate material at the top of the bed is being gradually increased and preferably the glass sheet is lowered completely into the bed before the particulate material in the top of the bed finally reaches its fully packed state.

FIG. 5 of the drawings showing a gas extraction system for controlling this way of operating. The vacuum pump 19 is connected to the gas-extraction ducts 7 and 8 through the manifold line 18 which includes a main solenoid valve 20, an adjustable control valve 21, a flowmeter 22 and a filter unit 23. A pneumatically operated control valve 24 is connected in parallel with the control valve 21 by a loop line 25. The part of the manifold line 18 between the vacuum pump 19 and the main solenoid valve 20 has a branch line 26 leading to atmosphere through a secondary solenoid valve 27.

When lowering of a hot glass sheet is started a limit switch, not shown, is operated which opens the main solenoid valve 20 and closes the secondary solenoid valve 27. Operation of the limit switch also starts a timer 28 which controls delayed operation of the control valve 24.

As shown in FIG. 6 with the main solenoid valve 20 open and the control valve 24 closed gas is initially extracted from the upper region of the fluidised bed through the ducts 7 and 8 at a continuous rate of about 1 liter/sec/meter length of the ducts 7 and 8 as set by the extent to which the control valve 21 is open. This condition remains for 20 seconds represented by the horizontal part of the curve A–B. At the end of this time the particulate material in the top of the fluidised bed will have reached a partial degree of compaction and the timer 28 then initiates the gradual opening of the control valve 24. As the control valve 24 gradually opens there is a corresponding gradual increase in the rate of extraction of fluidising gas from the upper region of the fluidised bed until after about 37 seconds a maximum rate of gas extraction of about 1.5 liters/sec/meter length of the ducts 7 and 8 is achieved. At this time drive to the control valve 24 is reversed to shut the valve 24, the solenoid valve 20 is closed and the solenoid valve 27 is opened. The lower edge of the glass sheet enters the top of the fluidised bed at time C on the curve of FIG. 6, that is 7 seconds after opening of the control valve 24 has started. At this time the upper region of the fluidised bed will have become further compacted but the degree of compaction is still such that the lower edge of the glass sheet can easily penetrate through the top surface of the bed. The glass sheet has passed completely through the top surface of the fluidised bed at time D, that is from 2 to 4 seconds after the lower edge of the sheet first enters the top of the bed, depending on the depth and speed of lowering of the glass sheet.

In the time interval between C and D on the curve the material in the upper region of the fluidised bed will have reached a degree of compaction higher than that which permits the lower edge of the glass sheet to penetrate readily through the top of the bed but which is more beneficial to the optical quality of the glass by minimising distortion of the hot surfaces of the glass sheet.

An initial preset degree of opening of the gate valve 21 governs the initial rate of extraction of gas from the upper region of the fluidised bed as represented by the part of the curve A–B in FIG. 6. The rate and extent of opening of the control valve 24 governs the rate of increase of gas-extraction and the resulting maximum gas-extraction rate, and the conditions are set as required in relation to any particular glass being processed, for example in relation to the thickness and temperature of the glass.

Using the above method sheets of soda-lime-silica glass 2.3 mm thick and bent to the shape of a motor vehicle windscreen and at a temperature of 660° C., were lowered into a fluidised bed of the $\gamma$-alumina at a speed of 300 mm/sec. The bed was at a temperature of 60° C. Each toughened glass sheet produced had a central tensile stress in the range 38 MPa to 42 MPa and no unacceptable distortion was produced in the glass sheets.

The method of providing a static layer of particulate material in the upper region of a fluidised bed to be used for the toughening of glass sheets has a subsidiary advantage when using a fluidising gas other than air, for example helium. Helium has a higher thermal conductivity than air and produces a more rapid cooling of a hot glass sheet immersed in the fluidised bed which results in a higher degree of toughening of the glass sheet. However, such fluidising gases as helium are expensive and cannot be allowed to escape to waste. The method of the invention permits the gas which is extracted from the top of the bed to be recycled continuously through the bed with little wastage. The method also has application in the operation of fluidised beds which employ toxic or otherwise dangerous fluidising gases or which result in the generation of such gases in their operation.

An example of this is the use of a fluidised bed of organic particulate material which is used for the dip coating of hot articles when immersed in the bed. Such fluidised beds produce toxic gases due to breakdown of the organic coating materials when heated and such gases can be safely removed by extraction of fluidising gas from the top of the bed. In this case it may be necessary to provide for entry of the articles into the fluidised bed other than through the static layer of particulate material at the top of the bed. The method of side entry of articles into a fluidised bed as described below with reference to FIGS. 7 and 8 would be suitable.

Another application of the use of such a static layer of particulate material on the top of a fluidised bed is in order to prevent the escape of light particulate material or when the particulate material contains a proportion of light fine particles.

To achieve a high production rate it is desirable that the tank 1 should be raised and lowered as quickly as possible. To avoid spillage of particulate material over the top edge 5 of the tank during raising and lowering gas may be extracted through the ducts 7 and 8 to defluidise the upper region of the bed during the raising and lowering operations.

FIGS. 7 and 8 of the drawings illustrate a tank 1 in which a gas-fluidised bed of particulate material may be maintained in a quiescent uniformly expanded state of particulate fluidisation in the manner described with reference to FIGS. 1 to 4 of the drawings.

In the apparatus of FIGS. 7 and 8 an end wall 30 of the tank 1 has a vertical slot-shaped opening 31 provided for side-ways entry of articles through the opening 31 into the fluidised bed. A pair of gas extraction ducts 7 and 8 are located vertically in the tank 1 adjacent vertical opening 31 and the end wall 30 one on either side of the lower end of the opening 31. Each of the ducts 7 and 8 comprises a U-shaped channel member 11. The face-to-face open sides of the channel members 11 are each covered with a layer of microporous woven wire mesh 12, similar material to that used in the arrangement of FIGS. 1 to 4 being suitable.

Each of the ducts 7 and 8 is connected to a gas-extraction pipe 17 and when suction is applied to the ducts 7 and 8 through the pipes 17, fluidising gas, usually air, is extracted from the region of the bed between the ducts adjacent the lower end of the opening 31 and the particulate material in this region becomes defluidised and packed in an unfluidised static condition. The particulate material adjacent the upper part of the slot 31 above the ducts 7 and 8 also becomes defluidised and packed because its supply of fluidising gas is cut off by the packing of the particulate material in the lower region of the fluidised bed between the ducts 7 and 8. Thus defluidisation ensures sufficient packing of the particulate material to obturate the opening 31 and prevent escape of th particulate material from the tank 1 through the opening 31. The suction applied to the ducts 7 and 8 is controlled to produce the degree of packing in the particulate material which obturates the opening but is such that an article, particularly in the form of a sheet, can pass through the opening 31 and then readily through the layer of static packed material adjacent the opening 31 into the main part of the fluidised bed for treatment in the fluidised bed.

With a fluidised bed of porous $\gamma$-alumina as described above for use in the apparatus of FIGS. 1 to 4, gas extraction ducts of 2.5 cm square cross section, 16 cm in length, and with faces spaced 10 cm apart were used used with a gas-extraction rate of between 0.76 and 0.86 liters/sec/per meter length of the ducts 7 and 8. Thus established a region of static particulate material of suitable dimensions and extent of packing sufficient to obturate the vertical slot-shaped opening 31.

A similar vertical opening with associated gas extraction ducts may be provided in the opposite end wall of the tank 1 for removal of the article from the tank.

In use of the arrangement of FIGS. 7 and 8 the region of packed particulate material produced adjacent the opening 31 may assume a wedge shape of greater cross section at the base of the bed and of smaller cross section at the top of the bed. This is because there may be some sideways ingress of fluidising air into the upper part of the region above the top of the gas-extraction ducts 7 and 8.

This effect can be minimised by use of the modification shown in FIG. 9. The gas-extraction ducts 7 and 8 extend down the full depth of the fluidised bed and which are divided into a number of vertically arranged compartments 33 by means of transverse walls 34. Each of the compartments 33 has an individual gas-extraction pipe 35. The suction applied to the pipes 35 is individually controlled so that the rate of air extraction from the compartments 33 decreases in passing from the lower to the upper compartments 33 in the ducts 7 and 8. This manner of operation results in the production of a defluidised region of substantially the same cross-section adjacent the full length of the opening 31.

The division of the vertical ducts 7 and 8 into compartments also avoids an effect by which the fluidising gas which is extracted at high pressure from the base of the fluidised bed through the lower parts of the ducts 7 and 8 may be fed back into the top of the bed through the upper ends of the ducts 7 and 8.

In one embodiment the ducts 7 and 8 in the arrangement of FIG. 9 are of 2.5 cm square cross-section with four individual compartments 33 15 cms long. With the faces of the ducts placed 10 cm apart it was found that in order to obtain a defluidised region of uniform cross section over the full height of the slot-shaped opening 31 in a fluidised bed of alumina as previously described, the gas extraction rates required were 5 to 6 liters/min for the bottom compartment 33 in the ducts 7 and 8, 4 to 5 liters/minute for the next compartment 33, 3 to 4 liters/minute for the third compartment 33 and 0 to 2 liters/minute for the top compartment 33. It was found that in some circumstances the top compartment 33 could be dispensed with if desired.

This embodiment of the invention is particulary applicable for carrying out processes in which material in sheet form is treated in the fluidised bed.

For example a hot glass sheet which is to be toughened by quenching in the fluidised bed may be suspended by its upper edge and conveyed horizontally into the fluidised bed through the side opening 31.

The apparatus of FIGS. 7 and 8 is also suitable for the thermal treatment, for example annealing, of metal sheets, and the drying of web-like materials such as paper or textiles by passing a web of the material continuously through the fluidised bed between rollers located on either side of the tank. The web of material enters the fluidised bed through the packed material adjacent the opening 31 in one end wall 30 of the tank 2 and passes out of the bed through the packed material adjacent the similar opening, not shown, in the opposite end wall of the tank.

Another embodiment of the invention is shown in FIGS. 10 and 11 of the drawings, which includes a tank 1 containing a gas-fluidised bed of particulate material. Two pairs of compartmentalised gas extraction ducts 7 and 8 of similar construction to the ducts 7 and 8 of FIG. 9 are mounted vertically in the centre of the tank 1 and are spaced apart from each other. A vertical dividing wall 36 extends between each of the ducts 7 and 8 and the corresponding longitudinal side wall 37 of the tank 1.

When suction is applied to the ducts 7 and 8 through individual gas extraction pipes 35 connected to the compartments 33 in the ducts 7 and 8, fluidising gas is extracted from the region between the pairs of ducts 7 and 8 and the particulate material in this region becomes defluidised and packed to form a wall 38 of packed particulate material dividing the fluidised bed into two separate parts 39 and 40.

The ducts 7 and 8 may be of the same dimensions as those described for the embodiment of FIG. 9, and when using the same γ-alumina the rate of gas-extraction from the individual compartments 33 of the ducts 7 and 8 is also the same as described with reference to FIG. 9.

This arrangement makes possible the two stage treatment of an article, for example a glass sheet, in the two separated parts 39 and 40 of the fluidised bed. For example the part 39 of the bed may at a sufficiently high temperature, e.g. 750° C. for heating a glass sheet to a temperature suitable for toughening, and the hot glass sheet is then passed from the part 39 into the part 40 of the bed through the wall 38 of packed particulate material for toughening of the glass sheet in the part 40 of the bed which is at a temperature suitable for quenching the hot glass sheet, e.g. 60° C. to 80° C.

The presence of the wall 38 of packed particulate material separating the two parts 39 and 40 of the fluidised bed enables different modes of fluidisation to be used in the two parts 39 and 40 of the bed. The part 39 of the bed may be operated in a bubbling mode using heated fluidising gas so as to achieve rapid heating of the glass sheet. Th part 39 of the bed may also contain immersed heating elements and the bubbling mode of fluidisation enhances the rate of heat transfer between the heating elements and the particulate material of the bed. The particulate material in the part 40 of the bed may be maintained in a quiescent uniformly expanded state of particulate fluidisation suitable for toughening of the glass sheet.

The passage of a hot glass sheet through the segregating wall 38 of packed particulate material pushes material out of the wall which may eventually lead to a partial break through between the two parts 39 and 40 of the bed. This is avoided by re-establishment of the wall 38 at suitable intervals. This is done by switching off the suction applied to a first pair of the gas-extraction ducts 7 and 8 so that the particulate material in the region of that pair of ducts and in the region separating the two pairs of ducts becomes fluidised. Suction is then reapplied to this pair of ducts 7 and 8 so as to re-establish that part of the wall 38 in the region of these ducts. While this is being done suction is maintained on the second pair of gas-extraction ducts 7 and 8. When the part of the wall 38 has been re-established between the first pair of ducts the suction applied to the second pair of ducts 7 and 8 is then switched off and then reapplied to re-establish the part of the wall 38 in the region of the second pair of ducts 7 and 8. The whole of the packed wall 38 then becomes re-established.

In the arrangement of FIGS. 10 and 11 vertical slot-shaped openings with associated vertical gas extraction ducts may be provided in the end walls of the tank for sideways entry and exit of sheets into and from the parts 39 and 40 of the fluidised bed as described with reference to FIGS. 7 and 8.

Another embodiment of the invention is illustrated in FIGS. 12 and 13 of the drawings. In this embodiment first and second banks 41 and 42 of parallel gas-extraction ducts 43 are mounted vertically in a tank 1 containing a gas-fluidised bed of particulate material. The ducts 43 in each of the banks 41 and 42 are spaced apart to permit vertical entry of a glass sheet between the banks. Each of the ducts 43 in the first bank 41 faces a corresponding duct in the second bank 42.

As shown in FIG. 13 each duct 43 comprises a U-shaped channel member 44. The open side of each channel member 44 is covered by a layer of microporous woven wire mesh 45. The ducts 43 have end-closure plates 46 and are each divided into a number of compartments 47 by transverse walls 48. Individual gas-extraction pipes 49 are connected with the compartments 47 of the ducts 43.

Suction is applied to each of the compartments 47 of the ducts 43 to extract fluidising gas from the regions between each pair of facing ducts 43 in the two banks of ducts 41 and 42 so that the particulate material in those regions of the fluidised bed is in an unfluidised static condition and packed in vertical bands 50.

The gas extraction ducts 43 may be of 2.5 cm square cross-section with individual compartments 47 15 cm long. The two banks 41 and 42 of ducts 43 are spaced 7.5 cm apart. When using a fluidised bed of γ-alumina suitable gas-extraction rates are 5 to 6 liters/min from the bottom compartment 47 of the ducts 43, 4 to 5 liters/min from the next compartment 47, 3 to 4 liters/min from the third compartment 47 and up to 2 liters/min from the top compartment 47.

A hot glass sheet 51 to be toughened is lowered into the fluidised bed between the two banks 41 and 42 of gas extraction ducts 43. The parts of the glass sheet contacted by the vertical bands 50 of unfluidised material between the facing pairs of gas extraction ducts 43 are cooled to a lesser extent and therefore receive a lesser degree of toughening than the parts of the glass sheet which are contacted by the fluidised particulate material existing between the bands 50 of defluidised material, and which are consequently toughened to a higher degree.

The resultant toughened glass sheets have vertical bands of lesser toughened glass alternating with bands of more highly toughened glass in the region affected by the banks of gas extraction ducts. For example by quenching a 3.0 mm thick sheet of soda-lime-silica glass for use as a vehicle windscreen, which sheet is at a temperature of 660° C. it has been found possible to produce in the sheet a vision zone comprising bands of lesser toughened glass in the sheet having a central tensile stress in the range 38 to 39 MPa alternating with bands of more highly toughened glass having a central tensile stress in the range 47 to B 49 MPa. On fracture of the windscreen, for instance by stone impact, the more highly toughened parts of the windscreen fracture into small non-cutting particles whereas the bands of lesser toughened glass in the windscreen break into large particles leaving some residual vision through the vision zone enabling the vehicle to be driven until the windscreen can be replaced.

We claim:

1. A method of operating a bed of gas-fluidised particulate material, comprising extracting gas from particles in a localised region of the bed so as to defluidise particulate material in that region and produce an unfluidised static condition of the particulate material in that region of the bed.

2. A method of operating a bed of gas-fluidised particulate material, comprising extracting gas through microporous gas-extraction means from the particles in a localised region of the bed at a rate such that the particulate material in said region of the bed is in a defluidised packed condition.

3. A method of treating an article in a gas-fluidised bed of particulate material, comprising moving the article in a path within a container for the bed, and selectively extracting gas from the particles in a localised region of the bed located in the path taken by the article so as to defluidise particulate material in that region and produce an unfluidised static condition of the particulate material in that region of the bed.

4. A method of thermally toughening a glass sheet in a gas-fluidised bed of particulate material, comprising maintaining said gas-fluidised bed at glass-quenching temperature, heating a glass sheet to a temperature above its strain point, lowering the hot glass sheet into said gas-fluidised bed, and defluidising the upper region of the bed through which the glass sheet passes as it enters the bed by selectively extracting gas from particles in said region at an extraction rate sufficient to maintain the defluidised particulate material which contacts the hot glass sheet in that region in a static packed condition as the glass sheet is lowered through that region and is subjected to an initial uniform cooling in that region by contact with said defluidised and packed particulate material.

5. A method of thermally toughening a glass sheet comprising maintaining a gas-fluidised bed of particulate material in a quiescent uniformly expanded state of particulate fluidisation, regulating the temperature of said bed so that it is at glass-quenching temperature, heating a glass sheet to a temperature above its strain point, lowering the hot glass sheet into said gas-fluidised bed, and extracting gas from particles in the upper region of the bed through which the glass sheet passes as it enters the bed at an extraction rate sufficient to produce an unfluidised static layer of the particulate material which contacts the hot glass sheet as the glass sheet is lowered through that region and is subjected to an initial uniform cooling by contact with said unfluidised static layer prior to further cooling in contact with the particulate material in a quiescent uniformly expanded state of particulate fluidisation.

6. A method according to claim 4 or claim 5, comprising continuously extracting gas from a region on either side of the path of the glass sheet in the upper part of the bed as the glass sheet is lowered into the bed.

7. A method according to claim 1, comprising extracting gas from particles in a plurality of localised regions of the bed so as to defluidise particulate material in those regions and produce an unfluidised static condition of the particulate material in each of said regions of the bed.

8. A method according to claim 1, comprising extracting gas from particles in a localised region of the bed at a rate to defluidise particulate material in that region and maintain the particulate material in that region in an unfluidised static condition, and immersing an article in the bed in such a way that a part of the article is contacted by said defluidised particulate material and receives a different treatment from a part of the article contacted by the gas-fluidised particulate material of the bed.

9. A method according to claim 1, comprising extracting gas from particles in localised regions of the bed to maintain the particulate material in each of said localised regions in an unfluidised static condition, and immersing an article in the bed in such a way that parts of the article which are contacted by said localised regions of particulate material in an unfluidised static condition receive a different treatment from parts of the article contacted by the gas-fluidised particulate material of the bed.

10. A method of thermally toughening a glass sheet in a gas-fluidised bed of particulate material, comprising maintaining said gas-fluidised bed at glass-quenching temperature, heating a glass sheet to a temperature above its strain point, extracting gas from particles in localised regions of the bed to defludise particulate material in those regions and maintain the particulate material in each of said localised regions in an unfluidised static condition, and immersing the hot glass sheet in the bed in such a way that parts of the glass sheet to be toughened to a lesser degree are contacted by said localised regions of particulate material in an unfluidised static condition, and parts of the glass sheet to be toughened to a higher degree are contacted by the gas-fluidised particulate material of the bed.

11. A method of thermally toughening a glass sheet in a gas-fluidised bed of particulate material, comprising maintaining said gas-fluidised bed at glass-quenching temperature, heating a glass sheet to a temperature above its strain point, extracting gas from particles in a series of vertical, horizontally-spaced regions of the bed to defluidise particulate material in those regions and maintain the particulate material in each of those regions in an unfluidised static condition, and lowering the hot glass sheet vertically into the bed so that parts of the glass sheet to receive a lesser degree of toughening contact the regions of particulate material in an unfluidised static condition and parts of the glass sheet between said regions are toughened to a higher degree by contact with gas-fluidised particulate material, thereby producing a differentially toughened glass sheet having bands of lesser toughened glass alternating with bands of more highly toughened glass.

12. A method of thermally toughening a glass sheet in a gas-fluidised bed of particulate material which is in a quiescent uniformly expanded state of particulate fluidisation, comprising maintaining said gas-fluidised bed at glass-quenching temperature, heating a glass sheet to a temperature above its strain point, extracting gas from particles in a series of vertical, horizontally-spaced regions of the bed to defluidise particulate material in those regions and maintain the particulate material in each of those regions in an unfluidised static condition, and lowering the hot glass sheet vertically into the bed so that the parts of the glass sheet to receive a lesser degree of toughening contact said series of regions of the bed in an unfluidised static condition and the parts of the glass sheet between said parts are toughened to a higher degree by contact with gas-fluidised particulate material in said quiescent uniformly expanded state of particulate fluidisation existing between the regions of said series, thereby producing a differentially toughened glass sheet having bands of lesser toughened glass alternating with bands of more highly toughened glass.

13. Apparatus for treating an article, comprising a container for a gas-fluidised bed of particulate material, and gas-extraction means mounted at a specific location in the container for extracting gas from particles in a localised region of the fluidised bed to defluidise particulate material in that region and thereby produce an unfluidised static condition of the particulate material in that region.

14. Apparatus according to claim 13, comprising means for moving the article in a path within the container, and wherein the gas-extraction means is positioned to produce said localised region of the fluidised bed in an unfluidised static condition in said path.

15. Apparatus according to claim 13, wherein the gas-extraction means comprises at least one microporous gas-extraction duct mounted at that specific location in the container.

16. Apparatus according to claim 15, comprising means for moving the article in a path within the container, and wherein said at least one microporous gas-extraction duct is positioned to produce said localised region of the fluidised bed in a static condition in said path.

17. Apparatus according to claim 16, comprising two elongated microporous gas-extraction ducts arranged face-to-face and spaced apart in the container to define a path for an article there between, which extraction ducts are arranged to extract gas from particles in the region of the fluidised bed between the ducts.

18. Apparatus according to claim 17, wherein said two elongated microporous gas-extraction ducts are mounted horizontally in an upper part of the container.

19. Apparatus according to claim 17 or claim 18, wherein the two ducts are parallel to each other.

20. Apparatus according to claim 14, wherein the gas-extraction means comprises a plurality of vertical microporous gas-extraction ducts which are spaced apart from each other and are positioned in the container to extract gas from particles in a plurality of localised vertical regions in the path of the article.

21. Apparatus according to claim 20, wherein the gas-extraction ducts are first and second banks of vertical parallel microporous gas-extraction ducts mounted in the container with the ducts in the two banks facing one another and spaced apart to permit vertical entry of an article between the two banks.

22. Apparatus according to claim 20 or claim 21, wherein each of the vertical microporous gas-extraction ducts is divided vertically into compartments with an individual gas-extraction pipe connected to each compartment.

* * * * *